US009855791B2

(12) United States Patent
Mezadourian et al.

(10) Patent No.: US 9,855,791 B2
(45) Date of Patent: Jan. 2, 2018

(54) EQUIPMENT FOR A WHEEL OF A BICYCLE AND CORRESPONDING RIM

(71) Applicant: DIAMANT WHEELS S.r.l., Sorga' (IT)

(72) Inventors: Gérard Mezadourian, Gardanne (FR); Federico Zecchetto, Sorga' (IT)

(73) Assignee: Diamant Wheels S.r.l., Sorga' (IT)

( * ) Notice: Subject to any disclaimer, the term of this patent is extended or adjusted under 35 U.S.C. 154(b) by 0 days.

(21) Appl. No.: 14/760,767

(22) PCT Filed: Jan. 20, 2014

(86) PCT No.: PCT/IB2014/058415
§ 371 (c)(1),
(2) Date: Jul. 14, 2015

(87) PCT Pub. No.: WO2014/111899
PCT Pub. Date: Jul. 24, 2014

(65) Prior Publication Data
US 2015/0361966 A1    Dec. 17, 2015

(30) Foreign Application Priority Data

Jan. 18, 2013   (FR) .................................... 13 50435

(51) Int. Cl.
| B60B 21/12 | (2006.01) |
| B60B 7/00 | (2006.01) |
| B60B 1/00 | (2006.01) |
| F03G 3/08 | (2006.01) |
| B62M 1/10 | (2010.01) |

(Continued)

(52) U.S. Cl.
CPC .............. B60B 21/12 (2013.01); B60B 1/003 (2013.01); B60B 7/0006 (2013.01); B62M 1/10 (2013.01); F03G 3/08 (2013.01); B60B 7/063 (2013.01); B60B 25/00 (2013.01); B60B 2360/32 (2013.01); B60B 2360/3416 (2013.01); B60B 2360/36 (2013.01); B60B 2900/1216 (2013.01); B60B 2900/351 (2013.01);
(Continued)

(58) Field of Classification Search
CPC ....... B60B 7/0006; B60B 21/12; B60B 1/003; B60B 21/00; B62M 1/10; F03G 3/08
See application file for complete search history.

(56) References Cited

U.S. PATENT DOCUMENTS 2,272,801 A    2/1942  Hawrylasz
3,237,965 A *  3/1966  Tokuo Asano ........... B62M 1/10
                                                280/217
(Continued)

FOREIGN PATENT DOCUMENTS

CN      201385544 Y    1/2010
DE        8912607 U1   2/1990
(Continued)

OTHER PUBLICATIONS

International Search Report dated May 13, 2014 from International Patent Application No. PCT/IB2014/058415 filed Jan. 20, 2014.

*Primary Examiner* — Kip T Kotter
(74) *Attorney, Agent, or Firm* — Sunstone IP

(57) ABSTRACT

The invention relates to an equipment for a bicycle wheel. The equipment comprises at least one profiled wing-shaped projection adapted to be secured to the inner surface of the rim of the wheel.

10 Claims, 3 Drawing Sheets

(51) Int. Cl.
*B60B 7/06* (2006.01)
*B60B 25/00* (2006.01)
*B62H 1/10* (2006.01)

(52) U.S. Cl.
CPC ........... *B60Y 2200/134* (2013.01); *B62H 1/10* (2013.01); *Y02T 10/88* (2013.01); *Y10T 74/2119* (2015.01)

(56) References Cited

U.S. PATENT DOCUMENTS

| | | | | |
|---|---|---|---|---|
| 5,061,013 | A * | 10/1991 | Hed | B60B 1/003 |
| | | | | 301/104 |
| 5,246,275 | A | 9/1993 | Arredondo, Jr. | |
| 5,893,614 | A * | 4/1999 | Dennis | B60B 7/01 |
| | | | | 301/37.101 |
| 6,196,638 | B1 * | 3/2001 | Mizuno | B60B 1/00 |
| | | | | 301/104 |
| 2007/0200422 | A1 | 8/2007 | Davis et al. | |
| 2008/0174166 | A1 | 7/2008 | Kalil | |
| 2008/0174168 | A1 * | 7/2008 | Yang | B60B 1/003 |
| | | | | 301/95.102 |
| 2009/0179480 | A1 * | 7/2009 | Modlinger | B60B 19/10 |
| | | | | 301/6.3 |
| 2010/0253132 | A1 * | 10/2010 | Schlanger | B60B 1/003 |
| | | | | 301/37.24 |
| 2011/0115280 | A1 * | 5/2011 | Mercat | B60B 1/003 |
| | | | | 301/55 |
| 2012/0080932 | A1 * | 4/2012 | Ilse | B60B 7/0086 |
| | | | | 301/6.3 |
| 2014/0252845 | A1 * | 9/2014 | Righini | B60B 1/003 |
| | | | | 301/37.24 |

FOREIGN PATENT DOCUMENTS

| | | | | |
|---|---|---|---|---|
| DE | 4416796 | A1 | 11/1995 | |
| DE | 102004047264 | A1 * | 4/2006 | ............ B60B 21/00 |
| DE | 102010034500 | A1 | 2/2012 | |
| EP | 0808728 | A2 | 11/1997 | |
| FR | 727466 | A | 6/1932 | |
| FR | 735976 | A | 11/1932 | |
| FR | 781971 | A | 5/1935 | |
| JP | 2008013158 | A | 1/2008 | |
| JP | 2008127001 | A | 6/2008 | |
| JP | 2009298394 | A | 12/2009 | |

* cited by examiner

EQUIPMENT FOR A WHEEL OF A BICYCLE AND CORRESPONDING RIM

TECHNICAL FIELD

The present invention refers to a device for a wheel of a bicycle, and to a corresponding rim comprising at least an equipment as described above.

BACKGROUND ART

As already known, the performance of a cyclist depends on several factors:

1—the power developed both by the torque during pedalling and by the cyclist capacity to create a high rotary motion using an average transmission ratio;

2—the aerodynamic position of the cyclist which reduces the frictional forces and allows a better penetration in the air; and 3—the different mechanical elements composing the bicycle: they must be of good quality to facilitate their movement and the braking.

On the mountains weight plays an important role due to the action of gravity on the assembly consisting of the bicycle and the cyclist. Comfort is appreciated, especially over long distances, as it makes more bearable the physical effort. A good rigidity provided by the structure allows an energy transfer from the cyclist to the wheels of the bicycle with a good yield. However, it is commonly known that an excessive rigidity negatively influences the physical abilities of the cyclist.

Therefore, the cyclist's performance is due to a skilful blend of all of the above factors.

In addition, weight and support distribution condition the holding of the wheel and its stability.

The yield of a modern bicycle is very high, in the sense that 97% of the power generated by the cyclist is used for the thrust of the velocipede. However, probably currently available bicycles do not allow the cyclist to use all the energy he has for thrusting the bicycle.

For example, taking into account the transmission of movement through a chain to the rear wheel by means of the rotation of the crank disc, a rotation produced by the alternated movement of the legs of the cyclist, the problem is not to increase the transmission efficiency, which, as previously said, is already about 97%, but to prevent this performance from drastically diminishing due to changes in the route conditions.

Two lines of research seem currently possible:

1—Designing a pedal which makes the most of the energy developed during the cyclist pedalling. This, for example, is the goal of the oval pedal. That pedal is designed to facilitate the passage through two dead points met while pedalling. That depends on the angle between the cranks in relation to different orientations of the gear.

2—Avoiding a too low inertia of the wheel during rotation, so that the efficiency does not drop too. Indeed, a lightweight wheel has a low initial inertia of rotation and can immediately provide an ease of feeling in pedalling with considerable starting acceleration. However, the initial positive effects deriving from the equipment of lightweight wheels can quickly backfire against the cyclist, who must prolong his/her physical effort to maintain the at first easily reached speed. In other words, a lightweight wheel does not store enough kinetic energy for giving it back (potential energy) thereafter, and if the cyclist is not perfectly fit, it can cause considerable negative consequences.

The invention is precisely based on this second line of research.

Accordingly, the present invention is based on the observation that, although it is true that an excessive overall weight of the bicycle/cyclist system is generally a negative factor, especially uphill, there is also some weight which, if adequately distributed on the bicycle, and in particular on the rim, can significantly improve the pedalling yields in particular conditions.

The present invention is essentially based on the use of centrifugal masses attached to the rims of the bicycle. From a static point of view, these centrifugal masses can lead to an increase in the weight of the bicycle comprised between 60 and 80 grams per wheel.

If these centrifugal masses, which are profiled wing-shaped projections, are fixed on lightweight wheels with low inertia, from a dynamic point of view these masses (due to developing centrifugal forces) apply a force on the rim shaft (from the inside to the outside). Such masses contribute, therefore, to reduce the tension loss due to different lateral forces applied to the hubs.

At low speeds, the mobility of the hub is significantly increased by maintaining an effective increasing radius (decrease of the vertical deflection by means of a stiffness increase). The uneven mountain roads are no longer a problem, and the comfort of the bicycle considerably increases. The bicycle reacts well to quick starts, and when the speed increases the wheel stiffens, thus allowing a better road handling downhill.

The shape of the dynamic masses and their weight are factors that contribute to improve the hold of the wheel on the axis of symmetry, and, consequently, the quality of performance provided by the pedal is optimal and the lateral deformation is reduced.

The passages through the (upper and lower) dead points are easily performed and the cyclist uses less energy to keep pedalling.

Moreover, as already known, the use during competitions (e.g. for timed competitions (called "races against the clock")) of solid wheels having an ultra-rigid composite structure has increased the overall performance of the bicycle. In spite of that, the side wind sensitivity of the wheels is a major handicap, and if weather conditions are not good, their use could prove dangerous.

For such a kind of races, it would be possible to continue to use traditional wheels with spokes, much less susceptible to wind, with lower but heavier centrifugal masses, conferring the required rigidity to the wheel.

It would be possible to vary, in a modular way, the shape of the centrifugal masses and their weight according to the type of racing, on the mountains, on the plains, or timed (called "races against the clock").

The materials used may be composite carbon/Kevlar™, or other fibres which have shown to get a good tensile strength.

Some plastics, such as, for example, ABS (acrylonitrile butadiene styrene), allow to reduce costs and to facilitate the diffusion of such devices.

For those applications, specifically designed rims are necessary because the present invention also concerns an anchoring system of the centrifugal masses.

The slide rail for the centrifugal masses can be formed in the thickness of the rim (negative rail), or a rail system can be adopted (positive rail).

In all cases, the centrifugal masses are not bonded to the rim but slidable with respect to the rim. This is important because it allows the system to adequately distribute the pressures exerted on the inner surface of the rim.

DISCLOSURE OF THE INVENTION

Accordingly, the object of the present invention is to provide an equipment for a bicycle wheel and a corresponding rim comprising at least an equipment as described above, which do not have the aforesaid disadvantages and at the same time are easily realizable and at a reduced cost.

The object of the present invention is thus an equipment for a bicycle wheel comprising at least one profiled wing-shaped projection adapted to be secured to the inner surface of the rim of the wheel. A further object is a rim for a bicycle wheel comprising at least an equipment according to the invention.

BRIEF DESCRIPTION OF DRAWINGS

For a better understanding of the present invention, a preferred embodiment is described below, purely as a non-limiting example and with reference to the accompanying drawings, wherein.

BEST MODE FOR CARRYING OUT THE INVENTION

Figure 1:
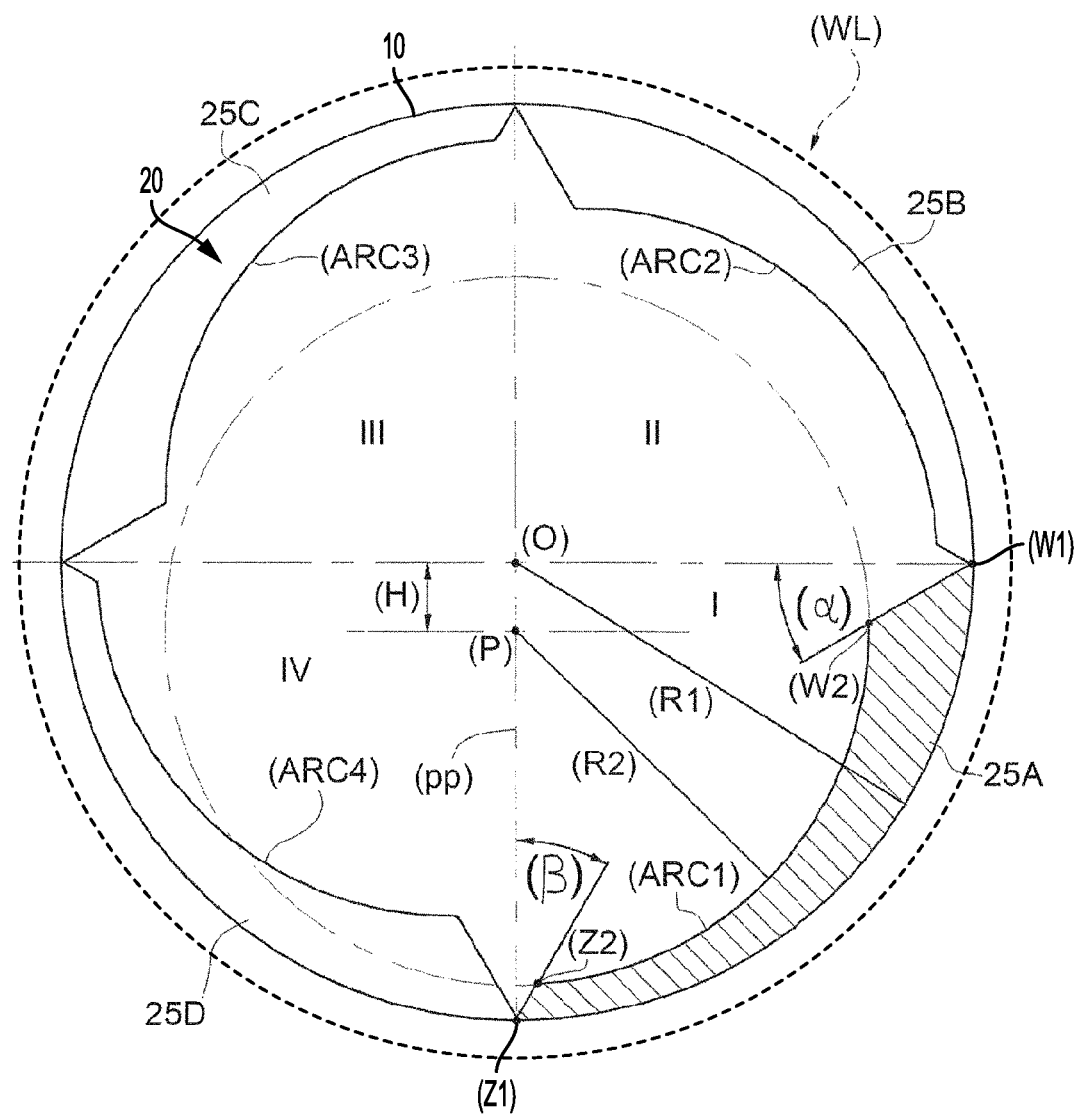
FIG. 1 schematically shows a front view of a bicycle rim comprising a first embodiment of an equipment according to the present invention.

In FIG. 1, a bicycle rim provided with an equipment 20 according to the teaching of the present invention has been indicated as a whole by the number 10.

The rim 10 is part, as already known, of a wheel (WL) (not shown) including in turn also an inner tube covered by a tire (not shown). The wheel (WL) is also optionally provided with a plurality of spokes, of known type and not illustrated, which physically connect the rim 10 to a hub (not shown).

In the first embodiment illustrated in FIG. 1, the equipment 20 comprises four profiled wing-shaped projections 25A, 25B, 25C and 25D, each of which occupies a respective quadrant I, II, III and IV of the rim 10.

Each profiled wing-shaped projection 25A, 25B, 25C and 25D is flat and can be advantageously made by cutting a metal sheet.

The inner profile of each profiled wing-shaped projection 25A, 25B, 25C and 25D can advantageously, but not necessarily, have the following geometrical characteristics with reference to the inner radius (R1) of the rim 10:

(R2)=0.6*(R1) to 0.8*(R1);
(H)=0.1*(R1) to 0.2*(R1);
($\alpha$)=20° to 45°;
($\beta$)=20° to 45°.

These optimal values have been obtained by means of a numerical modelling electronically processed by a computer and these first values were further confirmed by tests.

Considering now the first quadrant I delimited by points (W1) and (Z1) that are drawn on the circumference of the rim 10.

Now, by moving from the point (O), centre of the rim 10, along the perpendicular (pp) to a point (P) at a distance (H) of said point (O), it is possible to draw an arc (ARC1) of the radius (R2) (refer to the aforesaid directions).

An angle ($\alpha$) included advantageously, but not necessarily, between 20° and 45° (see the above directions) starts from the point (W1). In this way, a point (W2) is drawn on the arc (ARC1).

Analogously, an angle ($\beta$), also included advantageously, but not necessarily, between 20° and 45° (see the above directions) starts from the point (Z1). In this way, a point (Z2) is drawn on the arc (ARC1).

It should incidentally be noted that the angles ($\alpha$) and ($\beta$) may have identical or different values.

Accordingly, the points (W1), (W2), (Z2) and (Z1) delimit the profiled wing-shaped projection 25A, whose area has been highlighted by hatching.

The same operation can be performed on quadrants II, III and IV by drawing the respective arcs (ARC2) (ARC3) and (ARC4), which correspond to respective profiled wing-shaped projections 25B, 25C and 25D (FIG. 1).

The profiled wing-shaped projections 25A, 25B, 25C and 25D can be integral with the rim 10 or may be attached thereto, for example by means of a "dovetail" coupling. These profiled wing-shaped projections 25A, 25B, 25C and 25D create a frill effect on the wheel (WL).

Figure 2:
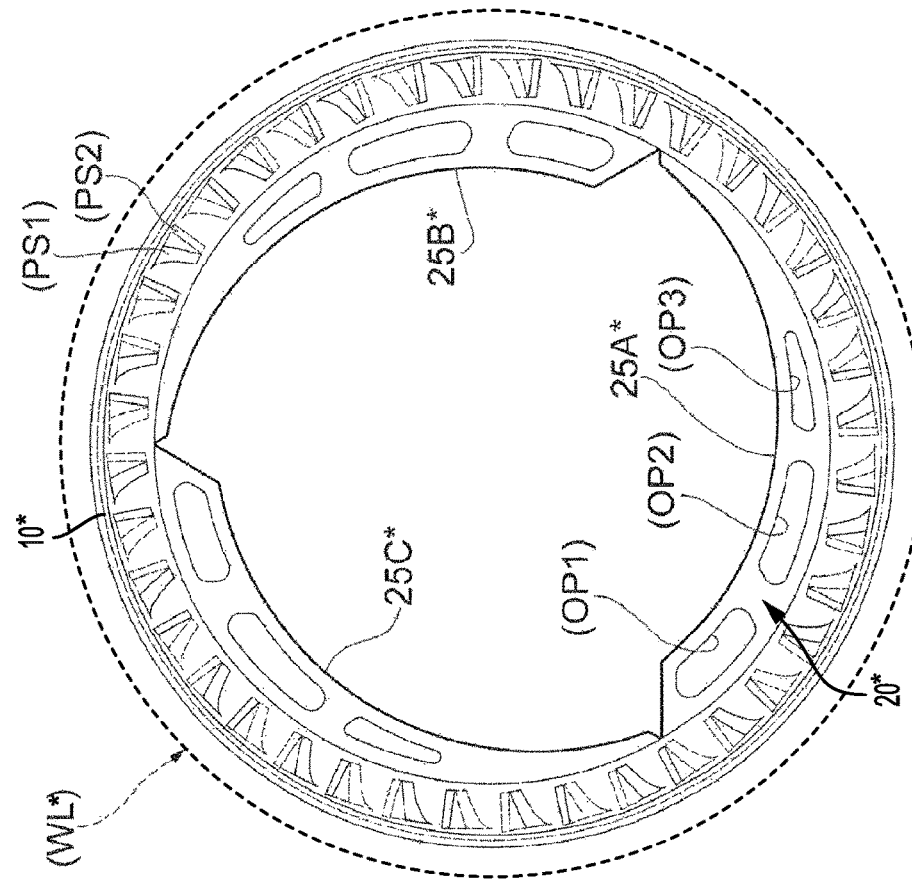
FIG. 2 shows a three-dimensional view of a bicycle rim comprising a second embodiment of an equipment according to the present invention.
Figure 3:
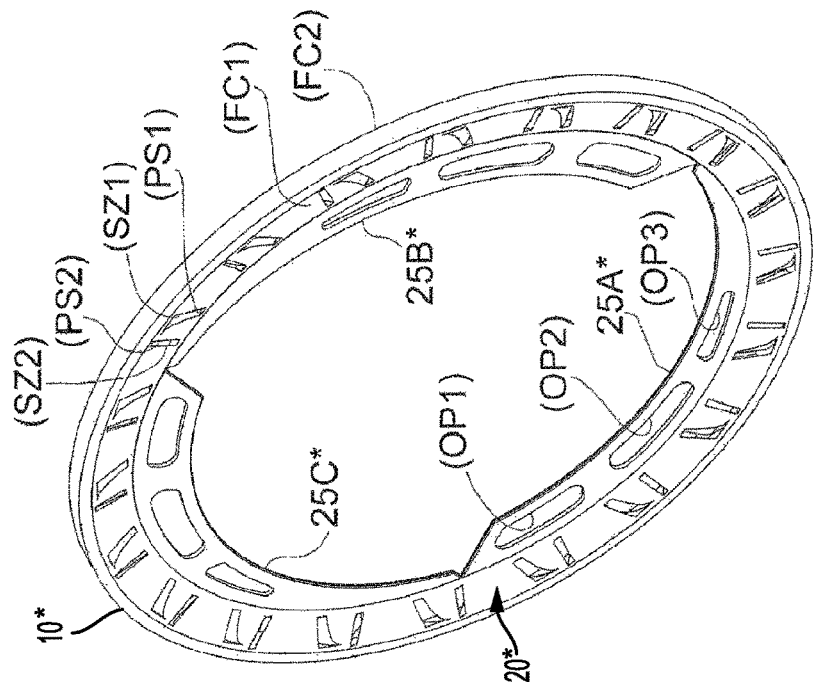
FIG. 3 shows a front view of the rim of FIG. 2.

In the second embodiment illustrated in FIGS. 2 and 3, the equipment 20* comprises three profiled wing-shaped projections 25A*, 25B* and 25C* (instead of four as in the first embodiment of FIG. 1) and are mutually offset by 120°.

Moreover, as shown in FIGS. 2 and 3, in this embodiment each profiled wing-shaped projection 25A* 25B* and 25C* may be provided with one or more openings (OP1), (OP2) and (OP3) to prevent said "sailing effect" due to the presence of strong side winds. These openings (OP1), (OP2) and (OP3) have a double function:

a) they create a controlled and alternative bearing capacity to better contrast the effects of side winds; and b) by changing their size, it is possible to vary the inertia of the wheels to suit the different cycling races.

In both embodiments, the weight of the profiled wing-shaped projections (25A, 25B, 25C, 25D; 25A*, 25B*, 25C*) is advantageously comprised between 60 g and 80 g per wheel.

Figure 4:
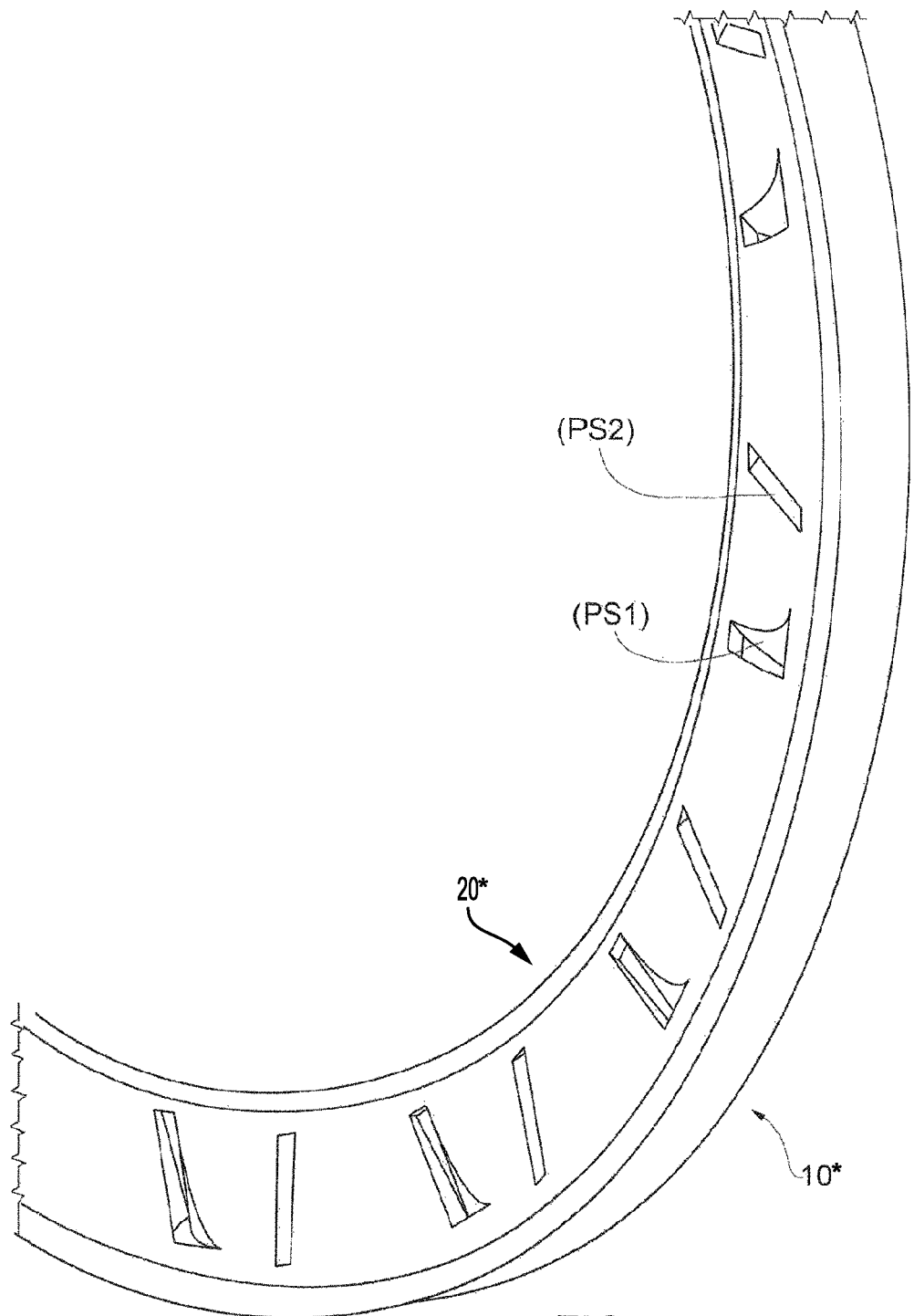
FIG. 4 shows a three-dimensional view of some enlarged details of a rim provided with at least a part of the equipment as shown in FIGS. 2 and 3.

Furthermore, according to another embodiment of the present invention illustrated in FIGS. 2, 3 and 4, a certain number of passages (PS1) and (PS2) have been made on the body of the rim 10*.

As illustrated more in detail in FIG. 4, each passage (PS1) and (PS2) has a three-dimensional inner profile designed according to the layer or contour of a portion of a wing-shaped profile, namely a wing-shaped profile commonly used for aircraft.

Advantageously, but not necessarily, the wing-shaped profile is of the NACA type.

Alternatively, on each of the two side faces (FC1) and (FC2) of the rim 10*, the inlet sections (SZ1) of the (PS1) passages are intercalated with the outlet sections (SZ2) of the (PS2) passages (FIG. 2).

In other words, advantageously but not necessarily, the (PS1) passages and the (PS2) passages are shaped like a mould of the same wing-shaped profile having a tapered shape.

Therefore, for (PS1) passages it is as if the wing-shaped profile "came in" through the side face (FC1) of the rim 10* and "came out" through the side face (FC2) arranged on the other side of this same rim 10*. On the contrary, for (PS2)

passages it is as if the wing-shaped profile "came in" through the side face (FC2) of the rim 10\* and "came out" through the side face (FC1) arranged on the other side of the same rim 10\*.

This advantageous alternation of (PS1) and (PS2) passages allows to remove the surplus wind that arrives from both the right and the left at 15°, 20°, 30° and 40°.

Moreover, by adequately designing the (PS1) and (PS2) passages as Venturi tubes, it is possible to create a natural acceleration of the wheel.

Also in this case, the "inlets" and "outlets" of the Venturi tubes can be mutually intercalated as previously illustrated.

The shape, number and length of (PS1) and (PS2) passages can be chosen so as to mitigate the negative effects of the above side winds.

The main advantages of the equipment for a bicycle wheel, representing the main object of the present invention are:

the passage through the (upper and lower) dead points is easily done and the cyclist uses less energy to keep pedalling;

the wheel, according to the weight and/or the shape of the profiled wing-shaped projections, stiffens as desired by the project designer to adapt the bike to different races (on the plains, on the mountains, timed (called against the clock), etc. . . . ), and the wheel becomes much more stable in case of strong side winds.

The invention claimed is:

1. Equipment for a wheel of a bicycle, comprising:
    at least one profiled wing-shaped projection positioned at an inner surface of a rim of the wheel, said rim having a first center and a first internal radius, (R1),
    wherein the at least one profiled wing-shaped projection has a profile and is positioned between first and second points along the inner surface of the rim, the profile shaped by and extending along an arc of a second circle having a second radius, (R2), and a second center, the second radius being such that (R2)=0.6\*(R1) to 0.8\*(R1);
    the second center of the arc of the second circle being placed at a distance, (H), from the first center, such that (H)=0.1\*(R1) to 0.2\*(R1);
    the profile of the at least one profiled wing-shaped projection having distal end shapes defined by a first angle (α) having a vertex at the first point and a second angle (β) having a vertex at the second point, the first angle (α) and second angle (β) each having a range between 20° to 45°, inclusive.

2. The equipment, according to claim 1, wherein at least one through opening is provided on said at least one profiled wing-shaped projection.

3. The equipment, according to claim 1, wherein said at least one profiled wing-shaped projection is integral with said rim.

4. The equipment, according to claim 1, wherein the weight of said at least one profiled wing-shaped projection is comprised between 60 grams and 80 grams per wheel.

5. The equipment, according to claim 1, wherein the equipment comprises at least one passage on at least one profiled wing-shaped projection.

6. The equipment, according to claim 5, wherein said at least one passage has a three-dimensional inner profile designed as a portion of a wing-shaped profile of the NACA type.

7. The equipment, according to claim 6, wherein on each of two side faces of said rim, inlet sections of the portions of wing-shaped profiles are intercalated with outlet sections of the portions of the same wing-shaped profiles.

8. The equipment, according to claim 5, wherein said at least one passage has a three-dimensional inner profile designed as a Venturi tube.

9. The equipment, according to claim 8, wherein on each of two side faces of said rim, inlet sections of Venturi tubes are intercalated with outlet sections of Venturi tubes.

10. The rim for the wheel of the bicycle comprising:
    at least one of said equipment according to claim 1.

* * * * *